Aug. 5, 1969  J. F. SHANNON  3,459,072
EPICYCLIC GEARING

Filed Nov. 13, 1967  5 Sheets-Sheet 1

United States Patent Office 3,459,072
Patented Aug. 5, 1969

3,459,072
EPICYCLIC GEARING
James Forrest Shannon, Bowdon, England, assignor to Associated Electrical Industries Limited, London, England, a British company
Filed Nov. 13, 1967, Ser. No. 682,175
Claims priority, application Great Britain, Nov. 16, 1966, 51,425/66
Int. Cl. F16h *1/28, 57/00*
U.S. Cl. 74—801                                       5 Claims

ABSTRACT OF THE DISCLOSURE

Helical gearing having the annulus resiliently supported by an annular corrugated bellows and with means for resisting axial thrust of the annulus.

---

This invention relates to epicyclic gearing and has an important application in epicyclic gearing employing double helical gears.

In epicyclic gearing it is important to provide flexibility on account of the multiple contacts bewteen the sun and planet wheels and between the planet wheels and the annulus. With double helical gears this is even more important because the cumulative effect of apex errors between the two sets of helices tends to cause jamming within the gears.

It has previously been proposed to support the annulus by helical springs extending radially outwards so as to provide a degree of radial movement and it has also been proposed to support the annulus on pistons located in hydraulic damping cylinders extending radially outwards. However, both these arrangements have been expensive and have required an appreciable amount of space which is not readily available in such equipment.

The main object of the invention is to provide an improved helical gearing which avoids these disadvantages.

The present invention comprises helical epicyclic gearing in which the annulus is supported by means of a flexible steel bellows having the corrugations extending annularly around the gearing and the bellows being secured at one end to the annulus and at the other end to a fixed support, together with a thrust member resisting the axial thrust of the annulus with a degree of resilience.

In the case of double helical gears the direction of the teeth may be such that the two annuli are forced together and resilient thrust members may be interposed between the two annuli.

It will be appreciated that the steel bellows provides a resilient cushioning which takes up an appreciable amount of shock.

In order that the invention may be more clearly understood reference will now be made to the accompanying drawings which show radial sectional views of epicyclic gearings embodying the invention and in which.

Figure 1:
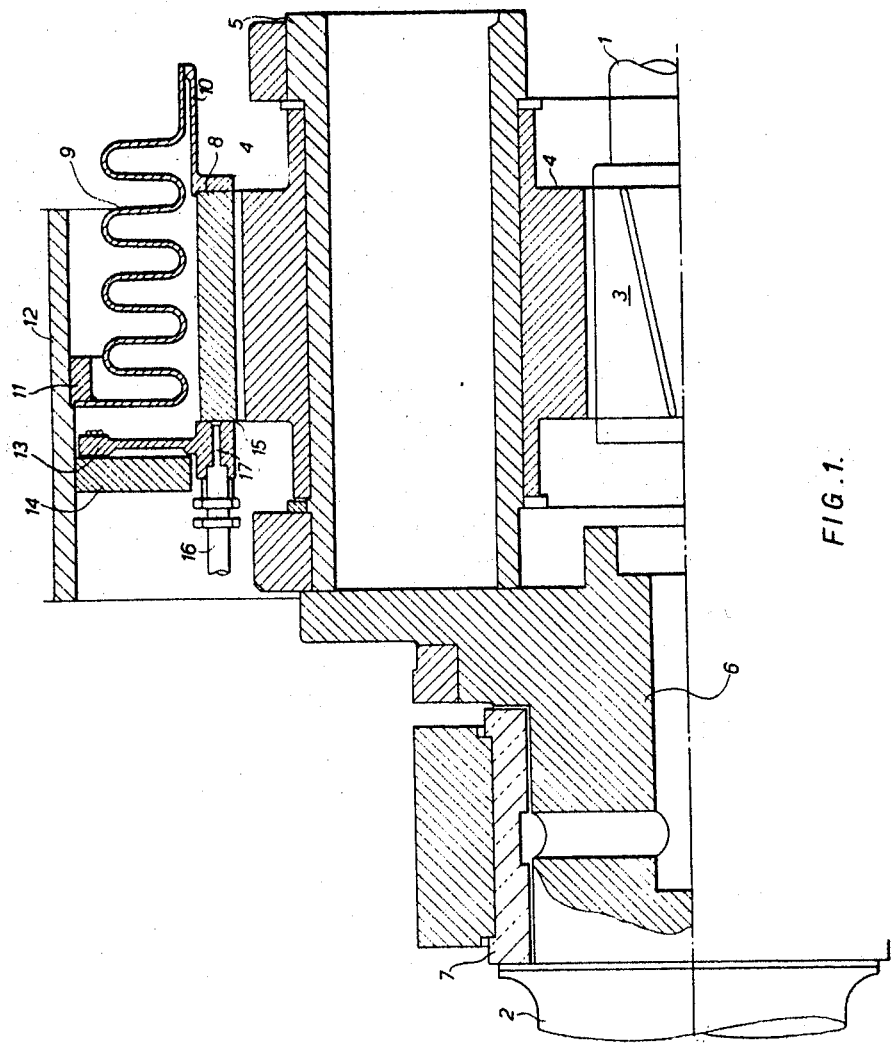
FIG. 1 shows a simple epicyclc gearing having single helical gears.

In the arrangement of FIG. 1 the reference 1 indicates the input shaft and 2 indicates the output shaft. Clearly the drive could be reversed and shaft 2 could be the input shaft and shaft 1 the output shaft. The input shaft 1 carries a sun wheel 3 meshing with a planet wheel 4 mounted on a planet wheel carrier 5. The planet wheel carrier 5 is secured to a hub member 6 rotating in a bearing 7 and secured to the output shaft 2. In a modified arrangement the hub member 6 has external gearing meshing with a gear wheel mounted on an output drive shaft.

The planet wheels 4 mesh with the surrounding annulus 8, which is stationary and is supported by the resilient steel bellows 9. This at one end is secured to the flange 10 extending from the annulus and at the other end is secured to a plate 11 carried by an external casing 12.

It will be appreciated that such an arrangement provides a flexible support for the annulus and at the same time it requires very little space to house it. Moreover it is easy to design such a steel bellows to stand up to the reactive troques, which may arise with overloads due to fault conditions in the machine which is being driven by the gearing.

At the same time it is necessary to provide resilient resistance to excessive axial movement of the annulus and in the arrangement shown in FIG. 1 this axial movement is limited by an annular resilient plate 13 the outer part of which is secured to a frame member 14 whilst the inner part abuts against a bearing surface 15 for the end of the annulus 8 preferably oil under pressure is supplied to a duct 16 in the passage 17 to lubricate the bearing surface 15.

Figure 2:
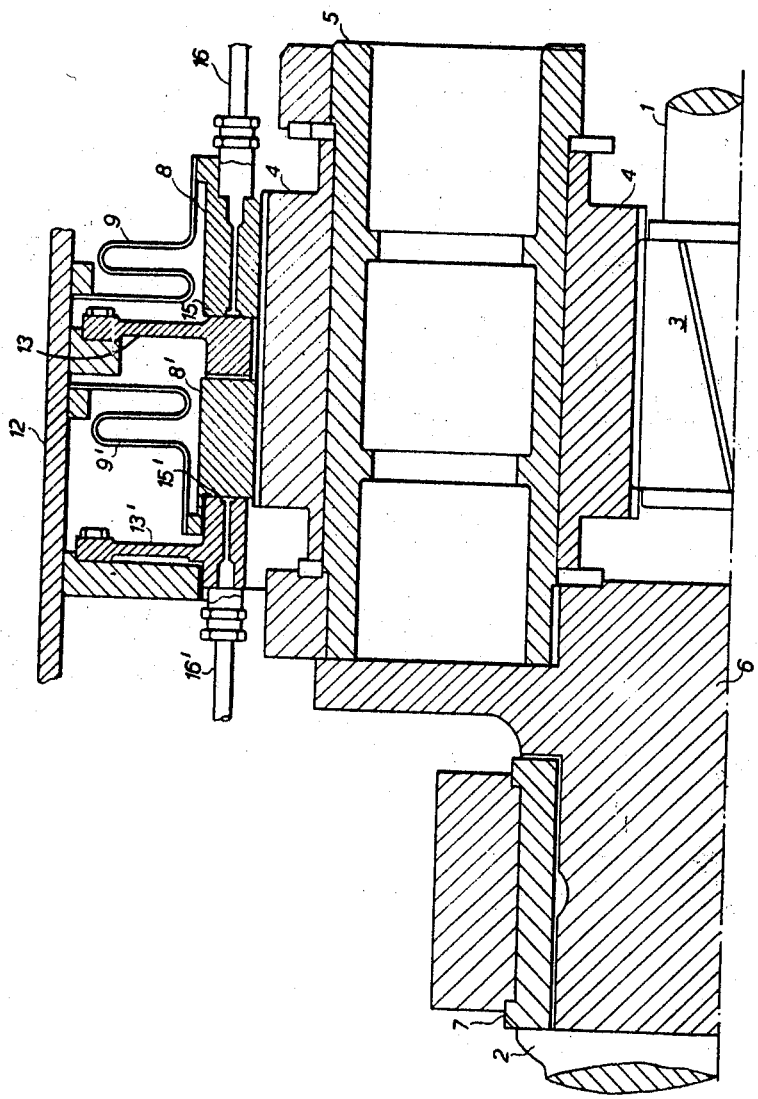
FIG. 2 shows another embodiment also using single helical gears, but having a split annulus.

FIG. 2 shows an arrangement which is similar to FIG. 1 and again uses single helical gearing, but in this arrangement the planet wheels 4 engage axially separate annuli 8 and 8'. As in the previous arrangement these annuli are carried by bellows 9 and 9' respectively. The bellows 9' being reversed axially as is clearly shown in the drawing, and similarly the oil supply ducts 16, 16' for the bearing surfaces 15 and 15' of the annuli extend in opposite directions from the equipment.

The arrangement of FIG. 2 permits the transmission of greater power than that of the FIG. 1 arrangement without the need for an excessively long annulus and bellows.

Figure 3:
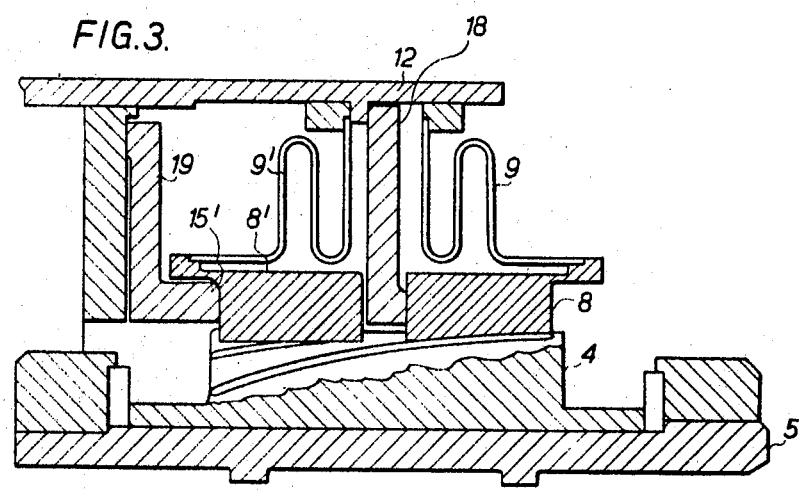
FIG. 3 shows a modification of the arrangement of FIG. 2.

FIG. 3 shows an arrangement which is similar to FIG. 2 excepting that the axial thrust plates 13, 13' are replaced by the spring discs 18, 19 the outer edges of which abut against the casing 12 whilst the inner edges abut against the bearing surfaces 15, 15' of the two annuli 8, 8'. In the arrangement shown the forced lubricating feed to the ducts 16, 16' is omitted.

Figure 4:
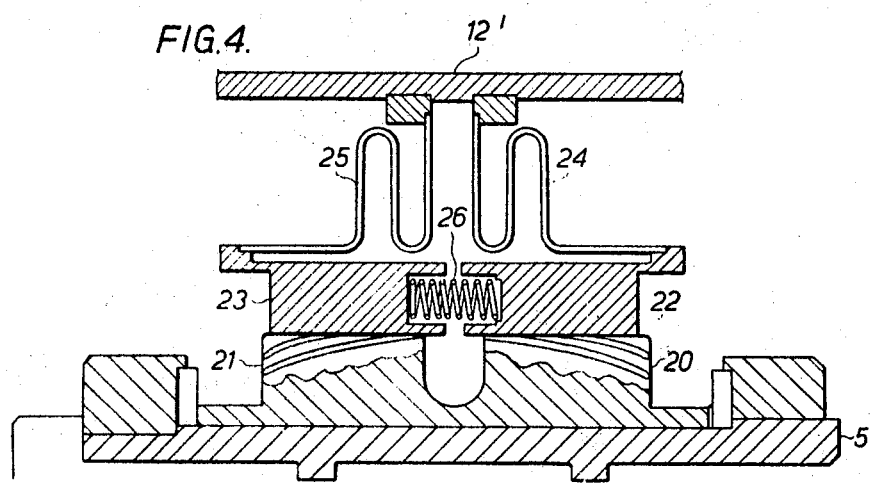
FIG. 4 shows an arrangement using double helical gears showing the annulus only.

FIG. 4 shows a further arrangement in which there are oppositely cut helical planet gears 20 and 21 engaging annuli 22 and 23 respectively. These annuli are supported by steel bellows 24 and 25 which corresponds with the bellows 9 and 9' shown in FIG. 2. The direction of the bevel of the gears is such that the two annuli 22 and 23 will be forced together and this axial thrust movement is resisted by a series of thrust springs 26 distributed around the annuli.

Figure 5:
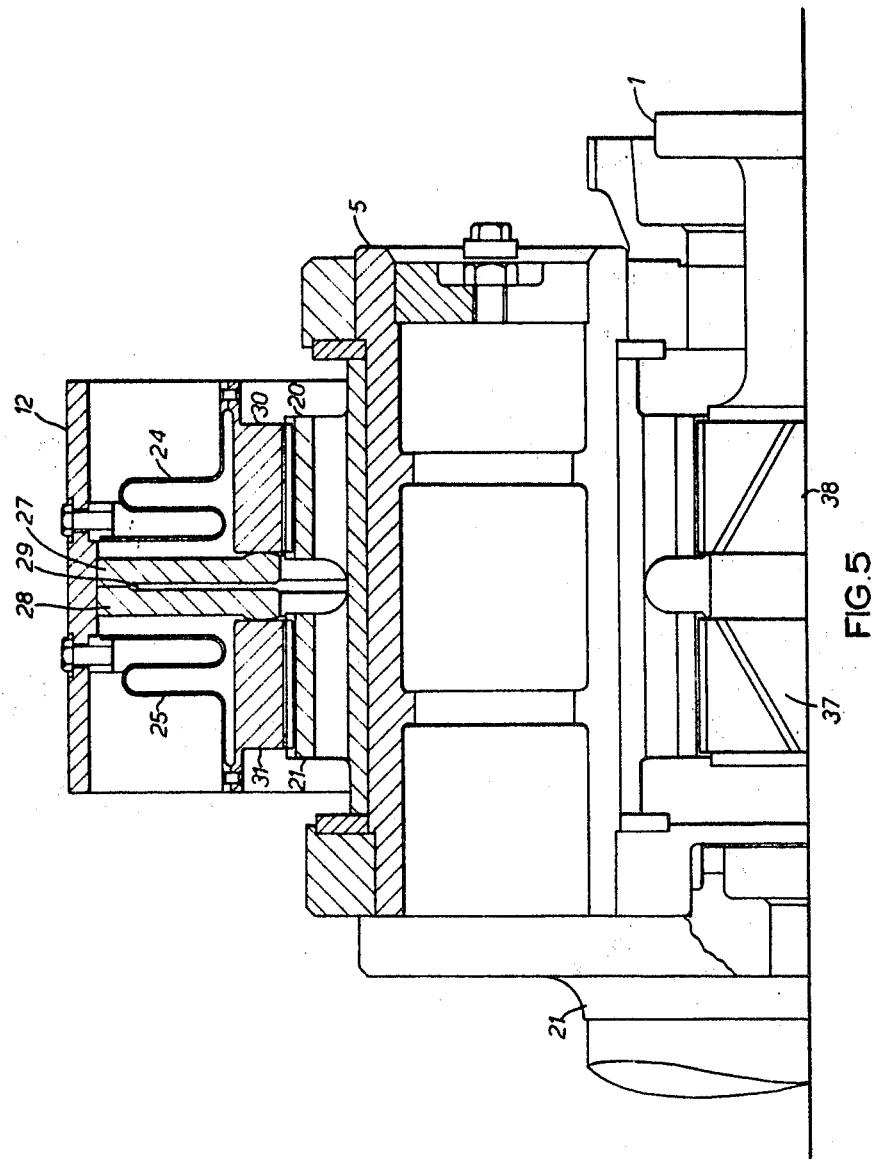
FIG. 5 shows a further arrangement using double helical gears.

FIG. 4 shows the annulus only and the remainder of the gearing will be as in FIG. 5.

FIG. 5 shows a modification of the arrangement shown in FIG. 4 in which the thrust springs 26 are replaced by flexible steel washers 27, 28. These are arranged with a small clearance 29 so as to allow for a small amount of axial movement of the two annuli.

The two planet wheels 20 and 21 mesh internally with sun wheels 37 and 38 respectively.

In the above arrangements the drive has been between the sun wheel and the planet carrier whilst the annulus is stationary and does not rotate.

Figure 6:
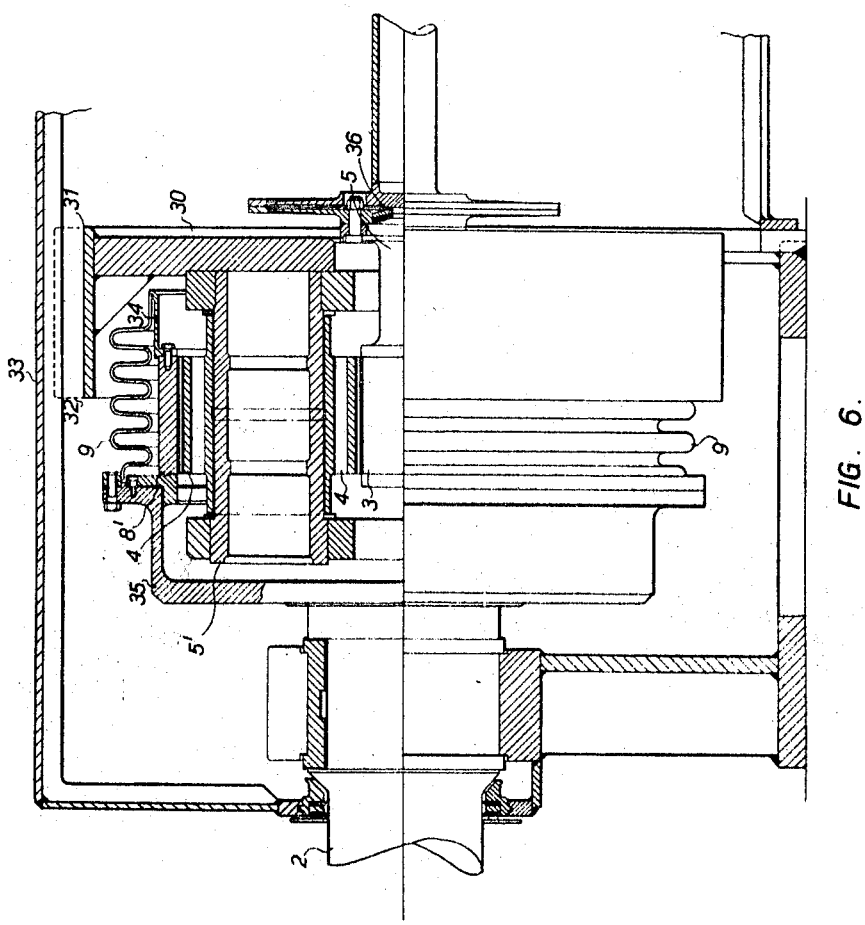
FIG. 6 shows an arrangement having a rotating annulus.

FIG. 6 shows an alternative arrangement in which the planet carrier is clamped against rotation and the annulus rotates and is coupled to the output shaft, or of course to the input shaft in cases in which the drive is in reverse direction.

In the arrangement of FIG. 6 the planet carrier 5' is carried by a plate 30 secured to an annular plate 31, which at 32 is held against rotation in a surrounding casing 33. The external annulus 8' is provided with a flange 34 secured to one end of the resilient bellows 9 the other end of which bellows is carried by a support member 35 mounted on the end of shaft 8. It follows that in this arrangement the annulus 8' rotates but at the same time it is resiliently carried as in the case in which it is stationary.

The axial thrust in this arrangement is resisted by spring 36.

I claim:
1. Helical epicyclic gearing, comprising:
   a sunwheel, planet wheels and at least one annulus,
   a cylindrical flexible steel bellows supporting said annulus,
   said bellows extending axially of the gearing and having connections securing one end of the bellows to the annulus and the other end to fixed support corrugations extending annularly around said bellows, and
   thrust resisting means resiliently resisting axial thrust of said annulus.
2. Helical epicyclic gearing as claimed in claim 1, comprising:
   at least two annuli displaced axially,
   a plurality of cylindrical flexible steel bellows, there being a separate bellows supporting each annulus,
   a seperate resilient thrust resisting means resisting axial thrust of each annulus, respectively.
3. Helical gearing as claimed in claim 1, having thrust resisting means, comprising:
   an annular resilient plate extending laterally of the gearing and so positioned that the annulus of the gearing reacts against the inner circumference of the plate whilst the outer circumference of the plate reacts against a fixed support.
4. Helical epicyclic gearing, comprising:
   axially aligned and opposed helical gears, each gearing comprising:
      a sunwheel, planet wheels and annulus,
      a separate cylindrical flexible steel bellows supporting each annulus,
      each bellows extending axially of the gearing and having connections securing one end of each bellows to the associated annulus and the other end to a fixed support, and
      resilient thrust means interposed between the annuli of the two gears and resisting movement together of said annuli.
5. Helical epicyclic gearing as claimed in claim 4, comprising:
   axial thrust means comprising:
      a pair of annular resilient plate members so positioned that the annuli of the two gears react axially against the inner circumferences of the respective plate members and the outer circumferences of the two plates react against each other.

References Cited
UNITED STATES PATENTS

| | | | |
|---|---|---|---|
| 2,247,839 | 7/1941 | Halford et al. | 74—801 |
| 2,759,376 | 8/1956 | Chamberlin et al. | 74—801 |
| 2,825,247 | 3/1958 | Haworth et al. | 74—801 |
| 2,868,040 | 1/1959 | Chamberlin | 74—801 |
| 2,883,885 | 4/1959 | Upton | 74—801 |
| 3,090,258 | 5/1963 | Zink et al. | 74—801 |

ARTHUR T. McKEON, Primary Examiner

U.S. Cl. X.R.

74—410